(12) United States Patent
Duchaine et al.

(10) Patent No.: US 9,645,019 B2
(45) Date of Patent: May 9, 2017

(54) DIELECTRIC GEOMETRY FOR CAPACITIVE-BASED TACTILE SENSOR

(71) Applicant: KINOVA, Boisbriand (CA)

(72) Inventors: Vincent Duchaine, Boisbriand (CA); Axaykumar Rana, Boisbriand (CA)

(73) Assignee: KINOVA, Boisbriand (CA)

( * ) Notice: Subject to any disclaimer, the term of this patent is extended or adjusted under 35 U.S.C. 154(b) by 0 days.

(21) Appl. No.: 14/762,289

(22) PCT Filed: Jan. 21, 2014

(86) PCT No.: PCT/CA2014/050040
§ 371 (c)(1),
(2) Date: Jul. 21, 2015

(87) PCT Pub. No.: WO2014/110683
PCT Pub. Date: Jul. 24, 2014

(65) Prior Publication Data
US 2015/0355039 A1    Dec. 10, 2015

Related U.S. Application Data

(60) Provisional application No. 61/754,758, filed on Jan. 21, 2013.

(51) Int. Cl.
*G01D 7/00* (2006.01)
*G01L 1/14* (2006.01)
*G06F 3/044* (2006.01)

(52) U.S. Cl.
CPC .............. *G01L 1/142* (2013.01); *G01L 1/146* (2013.01); *G06F 3/044* (2013.01); *G06F 2203/04103* (2013.01); *Y10T 428/24355* (2015.01)

(58) Field of Classification Search
CPC ..... H01L 2924/1461; H01L 2924/3025; G01L 1/142; G01L 1/146
(Continued)

(56) References Cited

U.S. PATENT DOCUMENTS 7,062,055 B2 *   6/2006   Pelrine .................. F04B 35/045
                                                               381/116
7,405,698 B2 *   7/2008   de Rochemont ...... H01Q 1/362
                                                               343/700 MS (Continued)

FOREIGN PATENT DOCUMENTS

CA          2430317          11/2004
DE          34 11 528 A1     10/1985
EP          1 698 876 A2     9/2006

*Primary Examiner* — Max Noori
(74) *Attorney, Agent, or Firm* — Norton Rose Fulbright Canada LLP

(57) ABSTRACT

A dielectric for a capacitive-based tactile sensor of the type having a pair of spaced apart conductive plates with the dielectric conductively therebetween, includes a body of a non-rigid dielectric polymeric material. The body is shaped into a microstructure defined by a plurality of members adapted to extend from one of the conductive plates to the other. Some of the members includes a first feature shaped to have a first end surface and a second end surface. Second features are integral with the first feature and project from the second end surface. A cross-section area of each of the second features is substantially smaller than a cross-section area of the first feature at the second end surface. A height of the first feature in a distance between the conductive plates is substantially greater than a height of the second features. A capacitive-based tactile sensor with the dielectric is also provided.

20 Claims, 6 Drawing Sheets

(58) Field of Classification Search
USPC .............. 73/780, 862.046, 862.626, 78
See application file for complete search history.

(56) References Cited

U.S. PATENT DOCUMENTS

| | | |
|---|---|---|
| 9,196,751 B2* | 11/2015 | Tseng .................... H01L 29/808 |
| 2010/0282000 A1 | 11/2010 | Gorjanc |
| 2012/0152605 A1* | 6/2012 | Das ........................ H05K 1/167 |
| | | 174/262 |
| 2012/0164836 A1* | 6/2012 | Chumakov ......... H01L 21/0337 |
| | | 438/702 |
| 2013/0009653 A1 | 1/2013 | Fukushima et al. |

\* cited by examiner

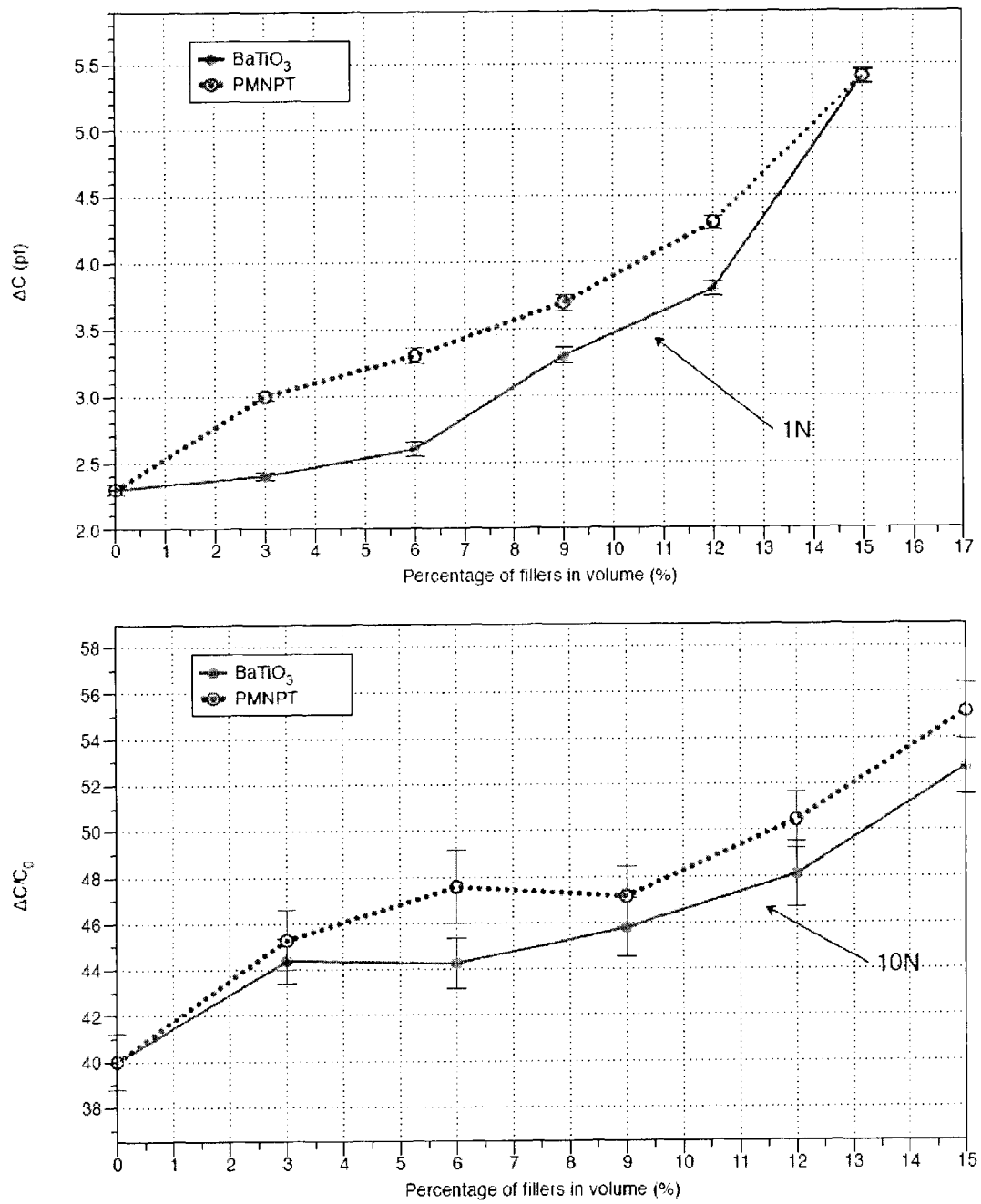
FIG. 4 (con't)

Stage 1. Development of microstructure mold with CO2 Laser cutter

Stage 2. Spreading the mixture of ECOFLEX doped with nanoparticles of BaTiO$_3$ over mold Stage 3. Laying a conductive fabric above silicone before curing Stage 4. Microstructured ECOFLEX and BaTiO$_3$ silicone dielectric with conductive fabric

DIELECTRIC GEOMETRY FOR CAPACITIVE-BASED TACTILE SENSOR

CROSS-REFERENCE TO RELATED APPLICATION

The present application claims priority on U.S. Provisional Patent Application Ser. No. 61/754,758, filed on Jan. 21, 2013.

TECHNICAL FIELD

The present disclosure relates to capacitive-based tactile sensors and to dielectrics used therein.

BACKGROUND OF THE ART

Some known capacitive-based tactile sensors use the relative change in distance d between two conductive plates as a way to measure the applied pressure $p_a$, namely:

$$p_a \propto C = \varepsilon_r \varepsilon_0 \frac{A}{d}, \qquad (1)$$

where C is the capacitance value, $\varepsilon_r$ and $\varepsilon_0$ are respectively the relative static permittivity and the vacuum permittivity and A is the overlap area of the plates. One element that often limits the sensitivity of these sensors is the mechanical response of the non-conductive material used between the electrodes and the ground plane, that serves as a dielectric as well as a spring-like element. It has been known to use a plain layer of soft polymer such as silicone [1] to create a soft dielectric (i.e., a non-rigid or resilient) that will deform under applied stress.

However, silicone and many other polymers used for such purpose may be considered as being incompressible. Hence, for a wide range of applied pressure, their volume will remain unchanged. In reaction to a compressive force on a specific area, some region of the dielectric will have to expand. This behavior may lead to inadequate compliance of the soft material as well as a relatively slow recovery time once pressure is released, two shortcomings that may result in hysteresis and in a relatively low sensor sensitivity.

To circumvent these drawbacks, silicone foam [2] or urethane foam [3] have been used as a dielectric for capacitive-based tactile sensor. Although, the volume of a foam under pressure can change, thus leading to a pressure sensor with increased sensitivity, regular foam is also subject to hysteresis. Ulmen et al. [4] have thus suggested using a closed cell polyurethane foam. The ratio of stiffness to damping in a foam with a closed cell structure is higher due to the trapped air that acts as spring-like elements. The nonlinearity of the response may thus be reduced. However, because of this structure, the stiffness of these foams is typically relatively high and their permittivity relatively low, thus leading to an average sensitivity. In order to increase the sensitivity and decrease the hysteresis, Mannsfeld et al [5] made a significant breakthrough by creating a microstuctured dielectric made out of polydimethylsiloxane (PDMS). By creating microfeatures in a PDMS layer using soft lithography, a material has been created with room for silicone to expand locally. Consequently, the apparent stiffness of the dielectric has been lowered and hysteresis has been reduced. However, the manufacturing of such a sensor, due to the size of the features, is based on soft lithography.

Soft lithography is a time-consuming process typically used for making micro-electro-mechanical systems (MEMS) that requires a significant amount of specialized equipments.

SUMMARY

It is an object of the present disclosure to provide a dielectric for capacitive-based tactile sensors that addresses issues associated with the prior art.

Therefore, in accordance with an embodiment of the present disclosure, there is provided a dielectric for a capacitive-based tactile sensor of the type having a pair of spaced apart conductive plates with the dielectric conductively therebetween, the dielectric comprising: a body of a non-rigid dielectric polymeric material, the body being shaped into a microstructure defined by a plurality of members adapted to extend from one of the conductive plates to the other, at least some of the members comprising: a first feature shaped to have a first end surface and a second end surface; at least two second features integral with the first feature and projecting from the second end surface; a cross-section area of each of the second features being substantially smaller than a cross-section area of the first feature at the second end surface; and a height of the first feature in a distance between the conductive plates being substantially greater than a height of the second features.

Further in accordance with the embodiment, the first feature is generally shaped as a truncated cone.

Still further in accordance with the embodiment, the second features are generally shaped as cones or truncated cones.

Still further in accordance with the embodiment, the first feature is generally shaped as a cylinder.

Still further in accordance with the embodiment, the second features are generally shaped as cylinders.

Still further in accordance with the embodiment, the non-rigid dielectric polymeric material is silicone embedded with at least one of microparticles and nanoparticles.

Still further in accordance with the embodiment, the silicone is embedded with at least a ferroelectric ceramic for increased relative permittivity of silicone.

Still further in accordance with the embodiment, the body is a monolithic molded piece.

Still further in accordance with the embodiment, a ratio of height of the first feature to the second feature ranges between 3:1 to 30:1.

Still further in accordance with the embodiment, a ratio of cross-section areas of the first feature to the second feature ranges between 3:1 to 40:1.

Further in accordance with the present disclosure, there is provided a capacitive-based tactile sensor comprising: at least a pair of spaced apart conductive plates and adapted to be wired to a controller; at least one body of a non-rigid dielectric polymeric material conductively received between the conductive plates, the body being shaped into a microstructure defined by a plurality of members extending from one of the conductive plates to the other, at least some of the members comprising: a first feature shaped to have a first end surface and a second end surface; at least two second features integral with the first feature and projecting from the second end surface; a cross-section area of each of the second features being substantially smaller than a cross-section area of the first feature at the second end surface; and a height of the first feature in a distance between the conductive plates being substantially greater than a height of the second features.

DETAILED DESCRIPTION

Figure 1:
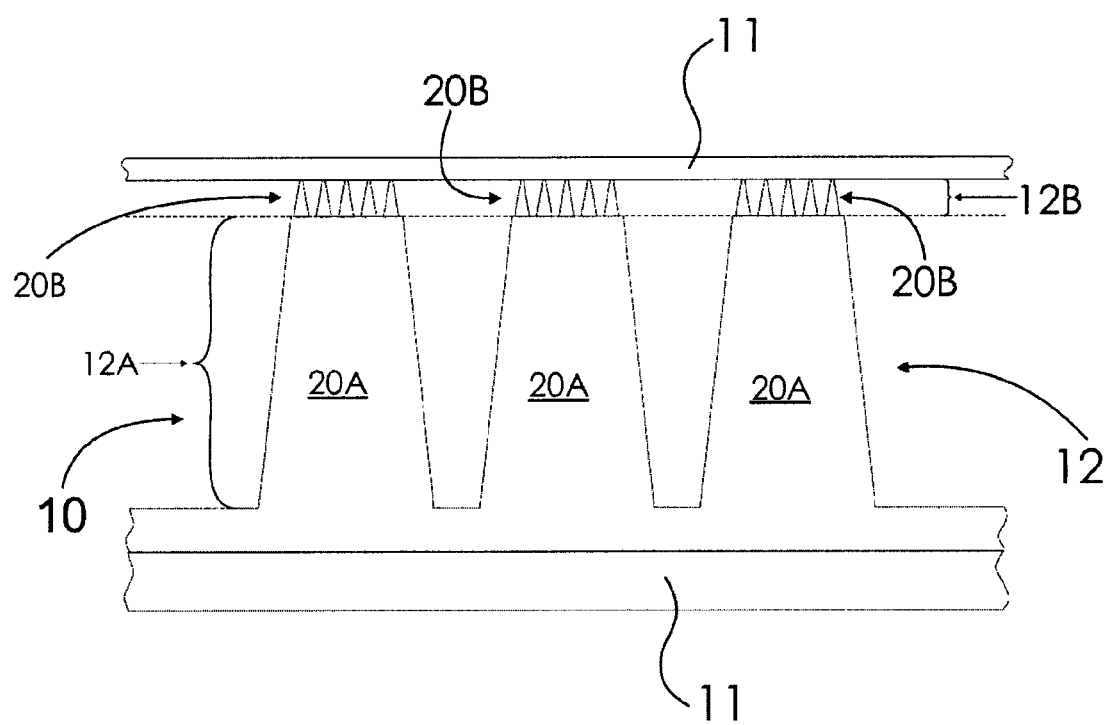
FIG. 1 is a schematic view of a dielectric between conductive plates of a capacitive-based tactile sensor in accordance with an embodiment of the present disclosure.

Referring to the drawings and more particularly to FIG. 1, a sensor part of a capacitive-based tactile sensor is shown at 10, and comprises a pair of spaced apart conductive plates 11 with a dielectric 12 therebetween. The capacitive-based tactile sensor 10 may be part of any appropriate apparatus, such as a robotic arm, robotic hand, manipulator, among many other possible applications. The conductive plates 11 are wired to a controller, which controller is not shown herein for simplicity.

The dielectric 12 of the sensor 10 is microstructured, but at a relative large magnitude so as to simplify the manufacturing process, for instance by the fact that specialized equipment may not be required, other than a $CO_2$ laser for instance. As described hereinafter, the permittivity of the dielectric 12 may also be increased by embedding nanoparticles of ferroelectric ceramics in the silicone or like polymeric material used for the dielectric 12.

According to [6, 7, 8], in order to be comparable to a human hand, a tactile sensor should be capable of measuring forces up to 10 N on a surface of 1 $cm^2$ (100 Kpa). To achieve fine manipulations, it is also important that the sensor remain sensitive in the range under 1 N [9] on the same area. To satisfy these two constraints that may be considered contrary from a technical point of view (sensing a considerable range of forces but also being sensitive to very low forces), the dielectric 12 has a microstructure of a plurality of members conductively extending between the conductive plates. Each of the members has at least two layers (or stages) of different sized features, namely stages 12A and 12B. It is considered to have additional stages, such as a third stage, a fourth stage, etc. The first stage 12A is composed of conic features 20A of a base diameter of 900 µm at a first end surface, although this base diameter may be within an acceptable range. In this non-limitative embodiment, the apex of the conic features 20A is at about 5 mm, but the height of the conic features is truncated at 800 µm, defining a frusto-conical geometry. Other geometries are considered as well, one of which is a cylindrical geometry, and others including prisms and pyramids. Moreover, it is pointed out that the frusto-conical geometry is not perfect as shown in the large scale of FIGS. 1 and 2 due to the manufacturing process, i.e., but reference will nonetheless be made to a frusto-conical geometry in spite of the pseudo-cone shape (or pseudo-cylinder, etc).

Figure 2:
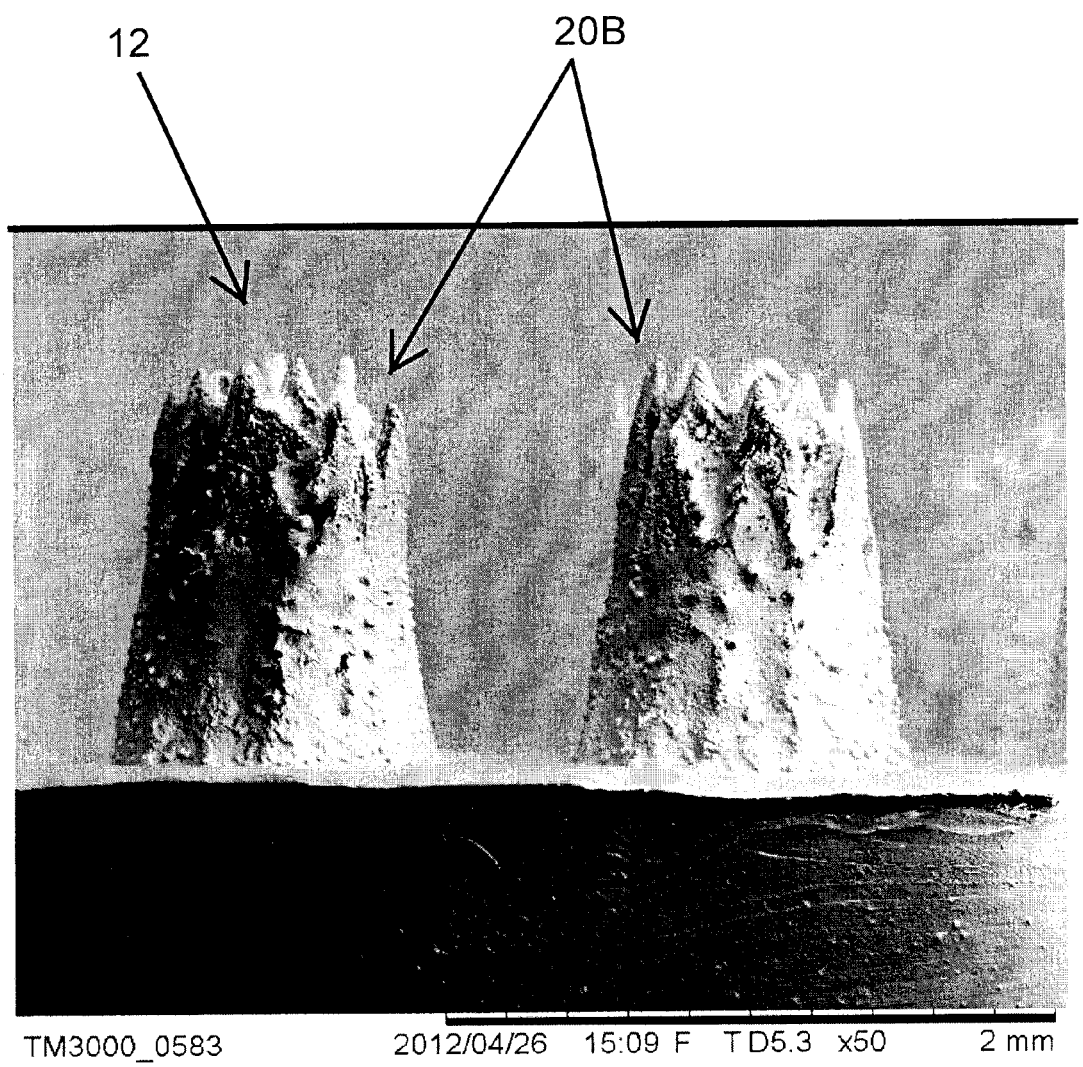
FIG. 2 is a enlarged side view showing the geometry of the dielectric of FIG. 1 as taken with an SEM microscope.

Due to their size and density over the surface (e.g., 64 per $cm^2$), the conic features 20A account for significant variation of the distance d between the two conductive plates 11 of the capacitive sensor 10 over most of the range of the possible applied pressure (10-100 Kpa). In order to increase the sensitivity of the sensor to the lower pressure range, on top of each of these truncated conic features 20A lies conic features 20B, of smaller base diameter, as projecting from an end surface of the conic feature 20A. As illustrated in FIGS. 1 and 2, the conic features 20B may be smaller cones or pseudo-cones. In the illustrated embodiment of FIG. 2, the conic features 20B may have a base diameter of about 80 µm and apex of about 100 µm. By being relatively easy to deform upon being exposed to pressures, the conic features 20B increase the variation of the distance d of eq. (1) for low applied stress values. However, their effect is negligible for higher stresses as the conic features 20B rapidly reach their maximum deformation. In similar fashion to the features 20A, the features 20B may have different geometries, one of which is a cylindrical geometry (or pseudo-cylinders). Accordingly, the diameter of the feature 20A at its surface interfaced with the base of the features 20B is greater than the sum of diameters of at least two features 20B. This interfaced surface is theoretical, as the features 20B are monolithically integral with the feature 20A. The feature 20A of the first stage 12A therefore has a height (i.e., in the distance d) that is substantially greater than a height of the second features 20B of the second stage 12B. For instance, a ratio of height ranging between 3:1 to 30:1 is well suited for the dielectric 12. Likewise, a cross-section area of the second features 20B is substantially smaller than a cross-section area of the first feature 20A, at the interfaced surface therebetween. For example, a ratio of cross-section areas ranging between 3:1 to 40:1 is well suited for the dielectric 12.

Figure 3:
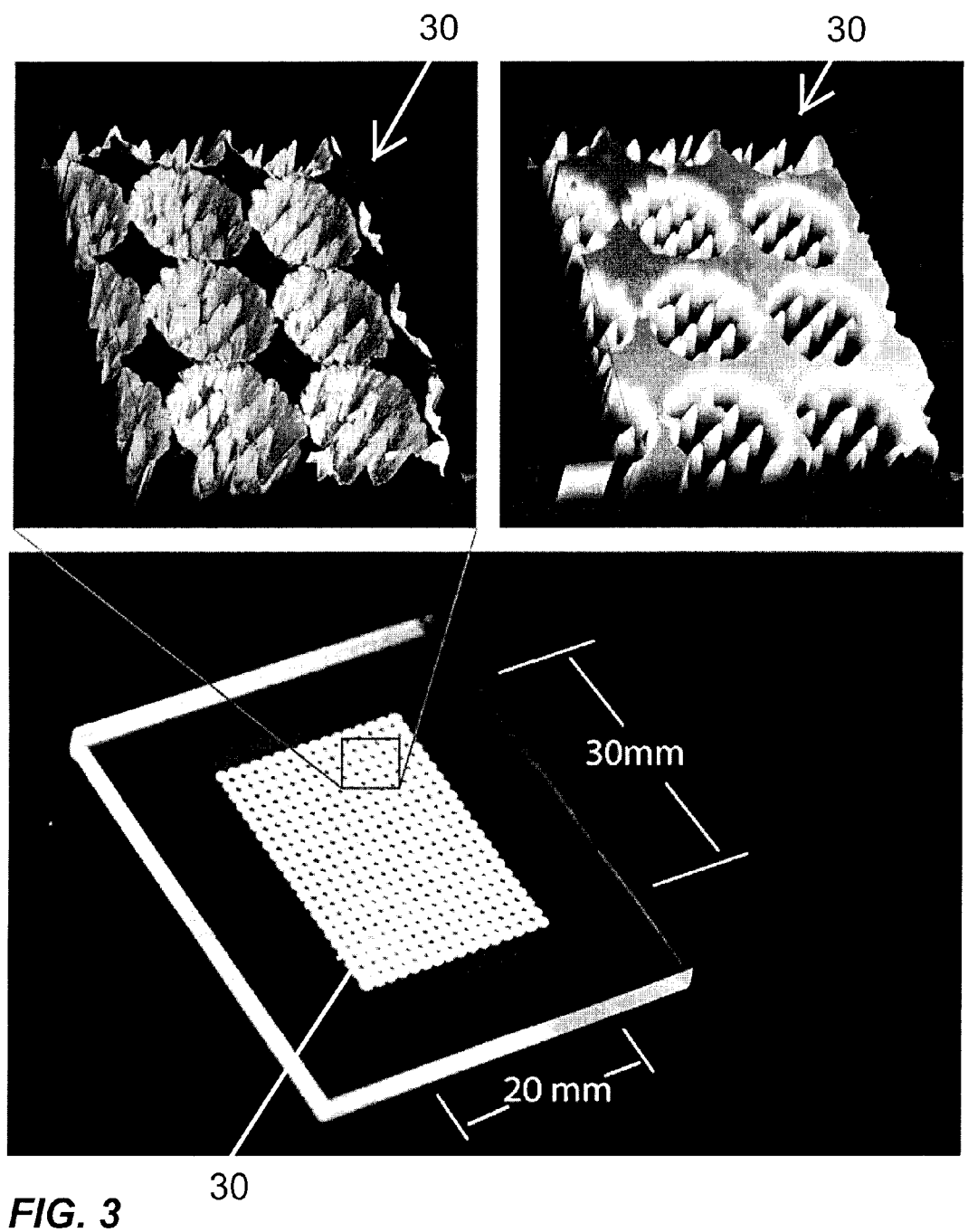
FIG. 3 is a picture of a resulting mold 30 as well as close up 3D views taken with an optodigital microscope.
Figure 5:
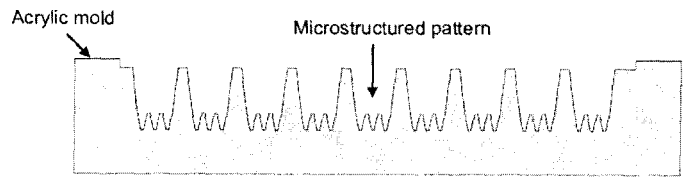
FIG. 5 are schematic view of a manufacturing process for the dielectric of FIG. 1.
Figure 5:
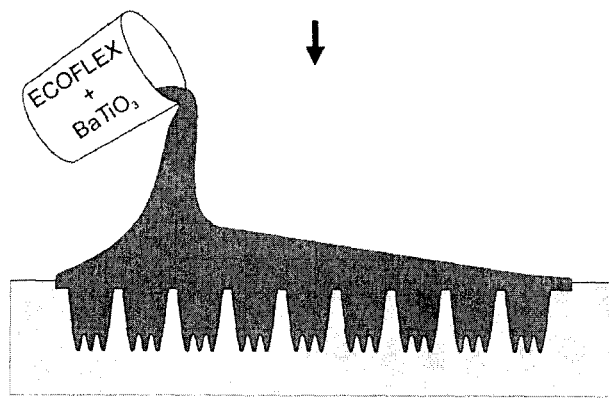
Figure 5:
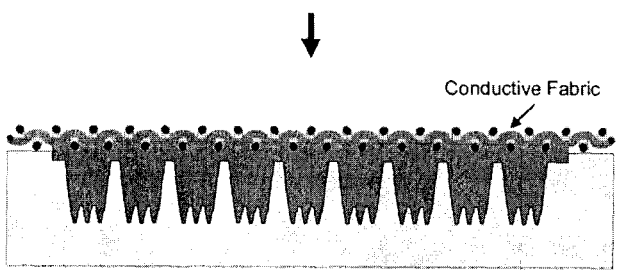
Figure 5:
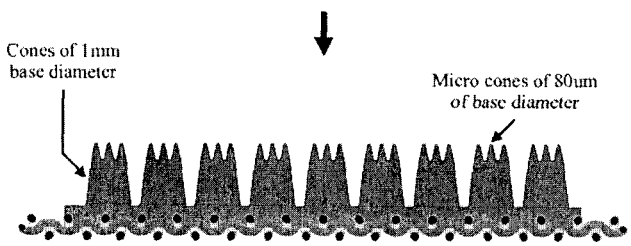

The microstructured dielectric 12 is made of a soft material (e.g., 30 on the 00 scale of Shore hardness), such as platinum cured silicone (Ecoflex 00-30, Smooth-On) cast in an acrylic mold. The mold may be engraved using a conventional $CO_2$ laser (e.g., Epilog Helix 40 watts). In some conditions, the maximum effective resolution of the laser cutter in the acrylic is 600 dpi. Indeed, due to the spot size of the laser as well as the heat diffusion in the mold material it may be difficult to engrave any features smaller than the size associated with this resolution. The base diameter of the smallest features 20B is closely related to this limitation. By controlling the speed of the machine as well as the power of the laser the desired height of the features 20B as well as the desired cone angle may be achieved. Following multiple experiments, rastering the acrylic in a single pass with a laser power of 90% and speed of 25% gave the desired depth of the mold (900 µm) and suitable results in terms of sharpness. For illustrative purposes, FIG. 3 shows a picture of a resulting mold 30 as well as close up 3D views taken with an optodigital microscope (Olympus DSX100). Moreover, FIG. 5 shows a series of steps that may be used to manufacture the dielectric 12 with the mold 30. It is shown that the numerous members may be interconnected by a base sheet, with the base sheet and members forming one monolithic body for the dielectric 12, with or without additives, and additional components such as the conductive fibers in the base sheet as in FIG. 5.

The microstructured configuration of the dielectric 12 of FIG. 1 has lowered the material stiffness and reduced the hysteresis arising from the incompressibility of silicones, as compared with existing configurations. To increase the pressure sensitivity of the capacitive-based tactile sensor 10, the static relative permittivity of the dielectric material may also be increased, thereby increasing the dielectric constant of the material to improve the signals-to-noise ratio. According to a first reason, for a given applied pressure, although the relative change in capacitance $\Delta C/C_0$ may be the same, increasing the dielectric constant will increase the magnitude of the capacitance $\Delta C$. Most off-the-shelf capacitance-to-digital converters (CDC) work based on time measurement of a response of the capacitor to an excitation signal [10]. The time is measured with a range that is limited in resolution. Therefore, up to a certain range, the greater the variation in Farads of the capacitance is, the higher the count will be, thus increasing the signals-to-noise ratio.

According to a second reason, numerous capacitive-based tactile [1, 2, 4, 3, 11] that have been proposed in literature consider the pressure measurement as a direct function of the change in the distance d between the two plates of the capacitor, i.e.

$$p_a \propto \varepsilon_r \varepsilon_0 \frac{A}{d(p_a)}. \quad (2)$$

This is assuming that there is no interaction between the deformation of the dielectric and the static relative permittivity of the material. For tactile sensors using plain silicone sheets or closed-cells foam as a dielectric, this is a valid approximation. However, with the microstructure of the dielectric 12, the static relative permittivity will vary as the proportion of air vs material in a given volume changes with the applied pressure. In this case the pressure measurement becomes $$p_a \propto \varepsilon_r(p_a)\varepsilon_0 \frac{A}{d(p_a)}. \quad (3)$$

This characteristic increases the non-linearity of the response but also the capacitance variation for a given load and thus the sensitivity of the sensor. In order to maximize this effect, a high relative permittivity of the material used in the dielectric of the sensor may be desirable to increase the variation between the overall dielectric constant under no load and maximum load.

The dielectric constant of typical polymers is generally below 5. In order to increase this property, a high-permittivity nanoparticles of ferroelectric ceramic may be embedded in the silicone of the dielectric 12. Nanoparticles of ferroelectric ceramic have been embedded in epoxy [12], polyurethane [13], polyamide [14], polydimethylsiloxane (PDMS) [15] and other silicones [16] for this purpose.

Figure 4:
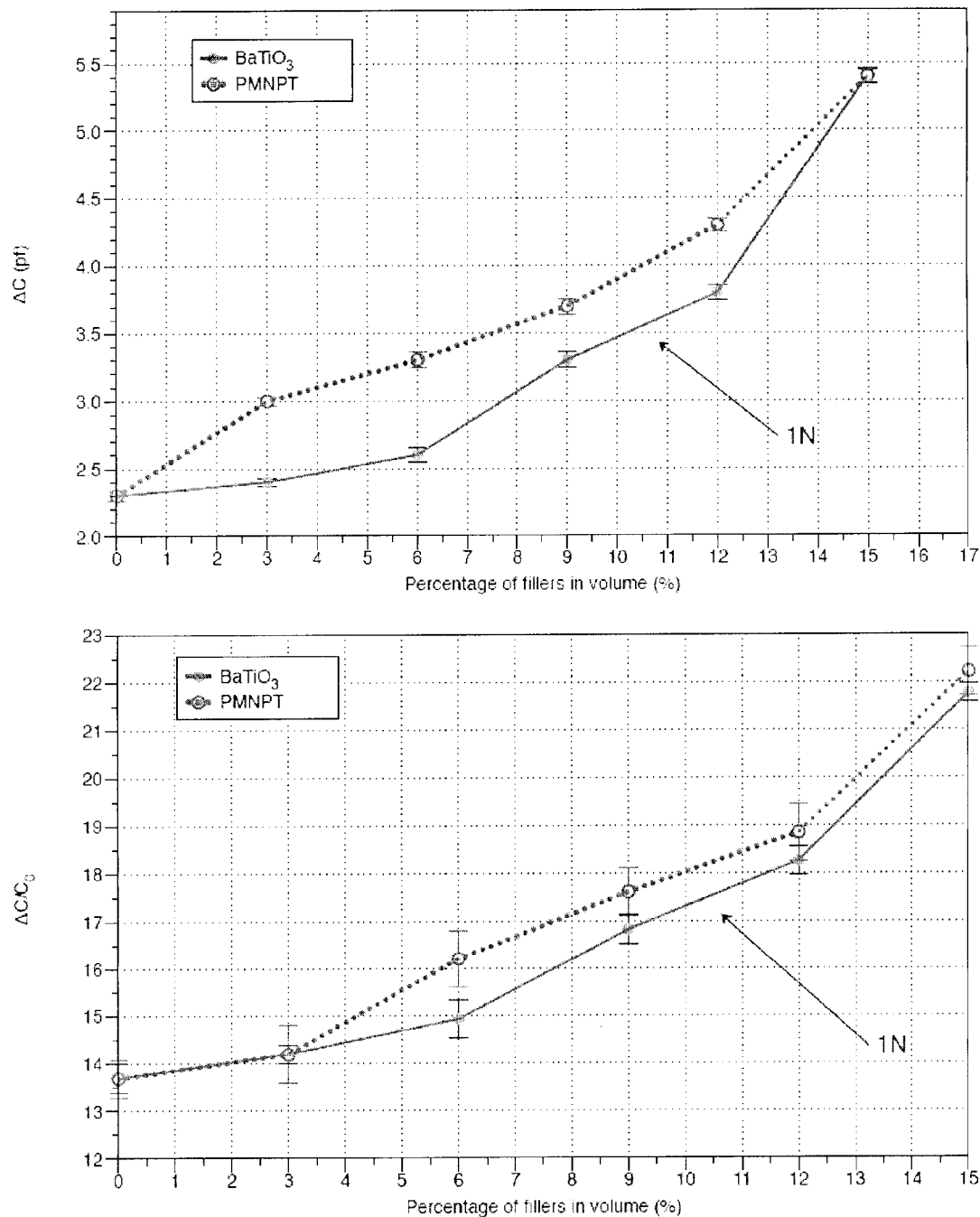
FIG. 4 shows graphs pertaining to the permittivity of a composite of the dielectric of FIG. 1 for different volume fractions of $BaTiO_3$ and PMN-PT.

One filler that may be used for increasing the dielectric constant of the silicone in the dielectric 12 is calcium copper titanate [17] ($CCTO$, $CaCu_3Ti_4O_{12}$) due to its high dielectric constant ($\in_r > 250000$) [18]. Other alternatives are barium titanate ($BaTiO_3$) and lead magnesium niobate-lead titanate (PMN-PT, $Pb(Mg_{1/3}Nb_{2/3})O_3$—$PbTiO_3$) nanopowder that have also a high dielectric constant. These two ferroelectric ceramics have been commonly used in the manufacturing of capacitors with high capacitance values and therefore are cost-effective solutions. In an embodiment, to increase the permittivity of the dielectric material, nanoparticles of $BaTiO_3$ of 200 nm size and tetragonal-like shape have been used (e.g., US Research Nanomaterials Inc.), as have spherical microparticles of PMN-PT of 3 μm (TRS Ceramic Inc. under the name PMN-38). According to the specification, these materials have a dielectric constant at room temperature of 4000 and 19 000 respectively. FIG. 4, provided as a non-limitative example, shows the values of the dielectric constants experimentally obtained for different volume fractions of $BaTiO_3$ and PMN-PT embedded the silicone matrix, for illustrative purposes. These values where calculated according to eq. (1) using the capacitance measured at 100 hz with a LCR meter (B&K Precision 878B) of different dielectric samples of a known area and thickness (4 cm² and 2 mm respectively). FIG. 4 suggests a quasi-linear relation between the volume fraction of filler and the dielectric constant of the composite. These values are also similar to reports in [20, 15, 21, 22, 23] for similar particles into a similar crosslinked matrix of silicone. Considering the high permittivity of the ceramic particles used, the dielectric constant value obtained for the composite may seem low. The resulting dielectric constant of a composite is not a simple function of the volume proportion between the polymer matrix and the filler. According to [23, 24, 25] this is due to the fact that a single crystal of the ceramics particles does not have the same permittivity along all 3 axes. For example the permittivity of a single crystal of $BaTiO_3$ has a permittivity of 4000, 100, and 100 along the a, b, and c axes, respectively. Since these particles are randomly aligned in the polymer matrix, the resulting permittivity is low.

The electrical property of the material used as a dielectric may be increased to characterize the performance of the sensor 10. The compliance of the dielectric material needs to be taken into account. If the electrical property of the composite is the sole consideration, PMN-PT may be a suitable choice according to the data shown in FIG. 4. In order to take into account the mechanical side of the problem, tests may be performed to characterize the relation between the stress applied and the capacitance variation. FIG. 4 show the capacitance variation $\Delta C$ for different volume fractions and for two different stresses (10 KPa and 100 KPa) as well as the relative change of capacitance $\Delta C/C_0$ for the same characteristics. This data was obtained with a force test stand (Mark-10 ES20,) equipped with force and displacement gauges (Mark-10 M4-10 and Mitutoyo 543-693, respectively) and the capacitance data was recorded with the above-referred LCR meter. These tests have been performed on the microstructured dielectric 12 created with the mold 30 of FIG. 3 on a taxel size of 64 mm². Despite the advantage of PMN-PT seen in FIG. 4 for the dielectric constant, the graphs presented in FIG. 4 show that the capacitance variation and the relative change in capacitance are almost the same for the two different composites at 10 KPa and 100 KPa. $BaTiO_3$ may advantageously be used as a filler due to its cost being lower than that of PMN-PT and due to some hysteresis observed on sensors using PMN-PT filled dielectric.

REFERENCES

[1] M. Leineweber, G. Pelz, M. Schmidt, H. Kappert and G. Zimmer, "New tactile sensor chip with silicone rubber cover," *Sensors and Actuators A: Physical*, vol. 84, no. 3, pp. 236-245, 2000.

[2] A. Schmitz, M. Maggiali, L. Natale, B. Bonino, and G. Metta, "A tactile sensor for the fingertips of the humanoid robot icub," in *In IEEE/RSJ International Conference on Intelligent Robots and Systems*, 2010.

[3] T. Hoshi and H. Shinoda, "Robot skin based on touch-area-sensitive tactile element," in *Robotics and Automation, 2006. ICRA 2006. Proceedings 2006 IEEE International Conference on*. Ieee, 2006, pp. 3463-3468.

[4] J. Ulmen and M. Cutkosky, "A robust, low-cost and low-noise artificial skin for human-friendly robots," in *Robotics and Automation (ICRA), 2010 IEEE International Conference on*. IEEE, 2010, pp. 4836-4841.

[5] S. Mannsfeld, B. Tee, R. Stoltenberg, C. Chen, S. Barman, B Muir, A. Sokolov, C. Reese, and Z. Bao, "Highly sensitive flexible pressure sensors with microstructured rubber dielectric layers," *Nature Materials*, vol. 9, no. 10, pp. 859-864, 2010.

[6] J. Dargahi and S. Najarian, "Human tactile perception as a standard for artificial tactile sensing a review," *The International Journal of Medical Robotics and Computer Assisted Surgery*, vol. 1, no. 1, pp. 23-35, 2004.

[7] E. Dellon, K. Keller, V. Moratz, and A. Dellon, "The relationships between skin hardness, pressure perception and two-point discrimination in the fingertip," *The Journal of Hand Surgery: British & European Volume*, vol. 20, no. 1, pp. 44-48, 1995.

[8] H. Ehrsson, A. Fagergren, and H. Forssberg, "Differential fronto-parietal activation depending on force used in a precision grip task: an fmri study," *Journal of Neurophysiology*, vol. 85, no. 6, pp. 2613-2623, 2001.

[9] G. Westling and R. Johansson, "Responses in glabrous skin mechanore-ceptors during precision grip in humans," *Experimental Brain Research*, vol. 66, no. 1, pp. 128-140, 1987.

[10] M. Gasulla, X. Li, and G. Meijer, "The noise performance of a high-speed capacitive-sensor interface based on a relaxation oscillator and a fast counter," *Instrumentation and Measurement, IEEE Transactions on*, vol. 54, no. 5, pp. 1934-1940, 2005.

[11] F. Castelli, "An integrated tactile-thermal robot sensor with capacitive tactile array," *Industry Applications, IEEE Transactions on*, vol. 38, no. 1, pp. 85-90, 2002.

[12] Y. Rao, S. Ogitani, P. Kohl, and C. Wong, "Novel polymer-ceramic nanocomposite based on high dielectric constant epoxy formula for embedded capacitor application," *Journal of Applied Polymer Science*, vol. 83, no. 5, pp. 1084-1090, 2001.

[13] S. Pyun, Y. Jin, and G. Lee, "Dielectric properties of pb (mg1/3nb2/3) o3-pbtio3/polyurethane 0-3 composites," *Journal of materials science letters*, vol. 21, no. 3, pp. 243-244, 2002.

[14] Z. Dang, Y. Lin, H. Xu, C. Shi, S. Li, and J. Bai, "Fabrication and dielectric characterization of advanced batio3/polyimide nanocomposite films with high thermal stability," *Advanced Functional Materials*, vol. 18, no. 10, pp. 1509-1517, 2008.

[15] D. Khastgirand K. Adachi, "Rheological and dielectric studies of aggregation of barium titanate particles suspended in polydimethylsiloxane," *Polymer*, vol. 41, no. 16, pp. 6403-6413, 2000.

[16] B. Liu and M. Shaw, "Electrorheology of filled silicone elastomers," *Journal of Rheology*, vol. 45, no. 3, pp. 641-657, 2001.

[17] S. Chung, I. Kim, and S. Kang, "Strong nonlinear current-voltage behaviour in perovskite-derivative calcium copper titanate," *Nature ma-terials*, vol. 3, no. 11, pp. 774-778, 2004.

[18] S. Guillemet-Fritsch, T. Lebey, M. Boulos, and B. Durand, "Dielectric properties of cacu3ti4o12 based multiphased ceramics," *Journal of the European Ceramic Society*, vol. 26, no. 7, pp. 1245-1257, 2006.

[19] Y. Yoneda, K. Sakaue, and H. Terauchi, "Dielectric investigation of batio3 thin-film capacitor," *Japanese Journal of Applied Physics*, vol. 39, p. 4839, 2000.

[20] D. Khastgir and K. Adachi, "Piezoelectric and dielectric properties of siloxane elastomers filled with barium titanate," *Journal of Polymer Science Part B: Polymer Physics*, vol. 37, no. 21, pp. 3065-3070, 1999.

[21] Y. Shen, E. Cherney, and S. Jayaram, "Electric stress grading of com-posite bushings using high dielectric constant silicone compositions," in *Electrical Insulation, 2004. Conference Record of the 2004 IEEE International Symposium on*. IEEE, 2004, pp. 320-323.

[22] C. Randall, S. Miyazaki, K. More, A. Bhalla, and R. Newnham, "Structural-property relationships in dielectrophoretically assembled ba-tio3 nanocomposites," *Materials Letters*, vol. 15, no. 1, pp. 26-30, 1992.

[23] E. Cherney, "Silicone rubber dielectrics modified by inorganic fillers for outdoor high voltage insulation applications," *Dielectrics and Electrical Insulation, IEEE Transactions on*, vol. 12, no. 6, pp. 1108-1115, 2005.

[24] F. Carpi, D. De Rossi, and R. Kornbluh, *Dielectric elastomers as electromechanical transducers: Fundamentals, materials, devices, mod-els and applications of an emerging electroactive polymer technology*. Elsevier Science, 2008.

[25] V. Tomer and C. Randall, "High field dielectric properties of an isotropic polymer-ceramic composites," Journal of Applied Physics, vol. 104, no. 7, pp. 074 106-074 106, 2008.

[26] L. Qi, B. Lee, W. Samuels, G. Exarhos, and S. Parler Jr, "Three-phase percolative silver-batio3-epoxy nanocomposites with high dielectric constants," *Journal of applied polymer science*, vol. 102, no. 2, pp. 967-971, 2006.

The invention claimed is:

1. A dielectric for a capacitive-based tactile sensor of the type having a pair of spaced apart conductive plates with the dielectric conductively therebetween, the dielectric comprising:
    a body of a non-rigid dielectric polymeric material, the body being shaped into a microstructure defined by a plurality of members adapted to extend from one of the conductive plates to the other, at least some of the members comprising:
        a first feature shaped to have a first end surface and a second end surface;
        at least two second features integral with the first feature and projecting from the second end surface;
        a cross-section area of each of the second features being substantially smaller than a cross-section area of the first feature at the second end surface; and
        a height of the first feature in a distance between the conductive plates being substantially greater than a height of the second features.

2. The dielectric according to claim 1, wherein the first feature is generally shaped as a truncated cone.

3. The dielectric according to claim 1, wherein the second features are generally shaped as cones or truncated cones.

4. The dielectric according to claim 1, wherein the first feature is generally shaped as a cylinder.

5. The dielectric according to claim 1, wherein the second features are generally shaped as cylinders.

6. The dielectric according to claim 1, wherein the non-rigid dielectric polymeric material is silicone embedded with at least one of microparticles and nanoparticles.

7. The dielectric according to claim 6, wherein the silicone is embedded with at least a ferroelectric ceramic for increased relative permittivity of silicone.

8. The dielectric according to claim 1, wherein the body is a monolithic molded piece.

9. The dielectric according to claim 1, wherein a ratio of height of the first feature to the second feature ranges between 3:1 to 30:1.

10. The dielectric according to claim 1, wherein a ratio of cross-section areas of the first feature to the second feature ranges between 3:1 to 40:1.

11. A capacitive-based tactile sensor comprising:
   at least a pair of spaced apart conductive plates and adapted to be wired to a controller;
   at least one body of a non-rigid dielectric polymeric material conductively received between the conductive plates, the body being shaped into a microstructure defined by a plurality of members extending from one of the conductive plates to the other, at least some of the members comprising:
      a first feature shaped to have a first end surface and a second end surface;
      at least two second features integral with the first feature and projecting from the second end surface;
      a cross-section area of each of the second features being substantially smaller than a cross-section area of the first feature at the second end surface; and
      a height of the first feature in a distance between the conductive plates being substantially greater than a height of the second features.

12. The capacitive-based tactile sensor according to claim 11, wherein the first feature is generally shaped as a truncated cone.

13. The capacitive-based tactile sensor according to claim 11, wherein the second features are generally shaped as cones or truncated cones.

14. The capacitive-based tactile sensor according to claim 11, wherein the first feature is generally shaped as a cylinder.

15. The capacitive-based tactile sensor according to claim 11, wherein the second features are generally shaped as cylinders.

16. The capacitive-based tactile sensor according to claim 11, wherein the non-rigid dielectric polymeric material is silicone embedded with at least one of microparticles and nanoparticles.

17. The capacitive-based tactile sensor according to claim 16, wherein the silicone is embedded with at least a ferroelectric ceramic for increased relative permittivity of silicone.

18. The capacitive-based tactile sensor according to claim 11, wherein the body is a monolithic molded piece.

19. The capacitive-based tactile sensor according to claim 11, wherein a ratio of height of the first feature to the second feature ranges between 3:1 to 30:1.

20. The capacitive-based tactile sensor according to claim 11, wherein a ratio of cross-section areas of the first feature to the second feature ranges between 3:1 to 40:1.

* * * * *